Patented May 14, 1929.

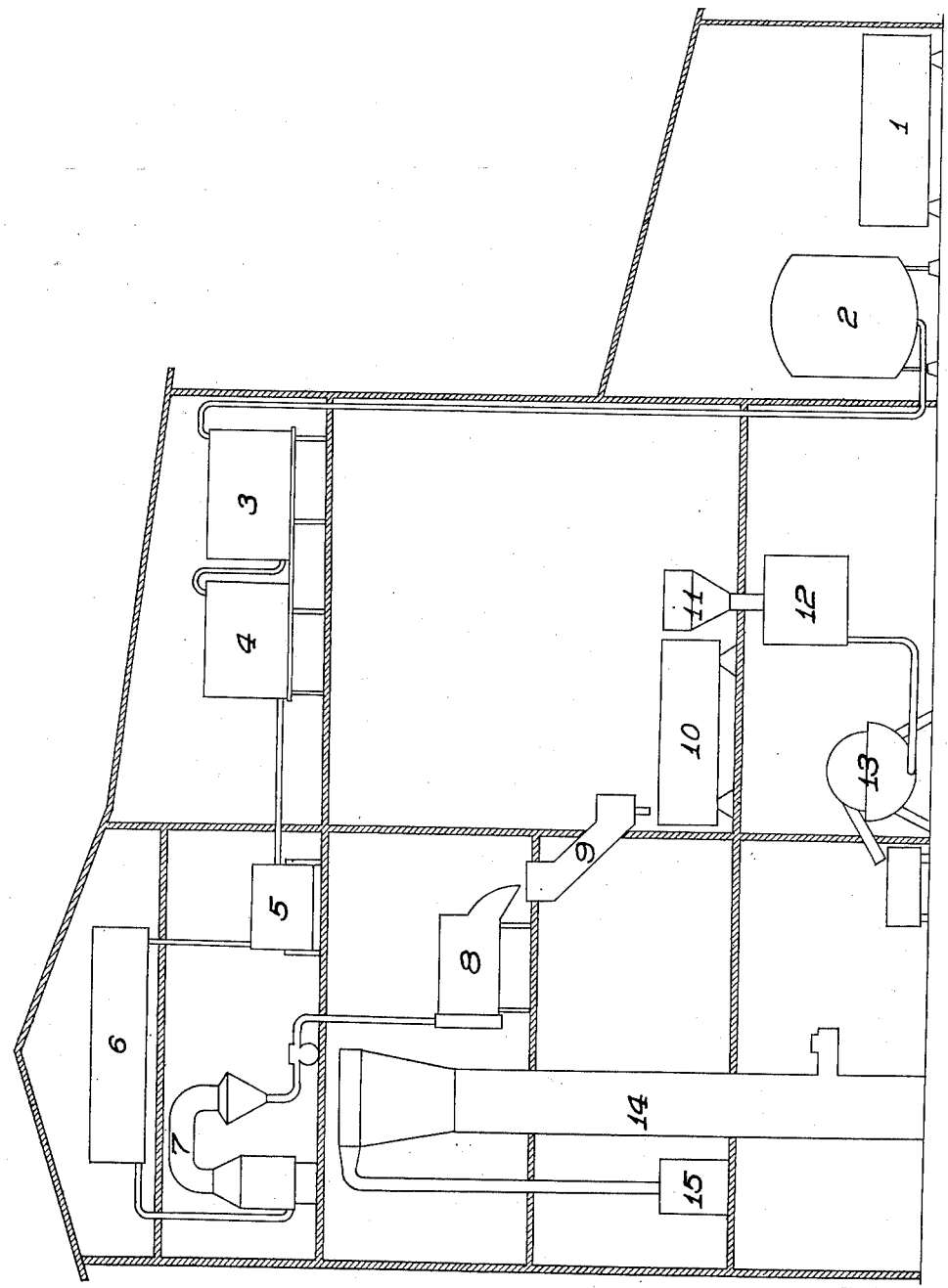

1,712,785

UNITED STATES PATENT OFFICE.

JOHN BECKER, OF SAN DIEGO, CALIFORNIA.

AGAR PRODUCT AND METHOD OF PRODUCING THE SAME.

Application filed December 7, 1926. Serial No. 153,167.

My invention relates to an agar product and the method of producing the same, and the objects of my invention are: first, to produce a valuable agar product from seaweed, such as gelidium, which is a pure, clean and sanitary vegetable product; second, to provide a novel, clean and sanitary process of preparing an agar product from seaweed such as gelidium and the like and reducing the same to dry form for use; third, to provide a process of preparing a new agar product from seaweed, which is a gelatinous substance used for various industrial purposes, some of which are development of bacilli cultures, medical purposes and for use as food and as ingredients of food; fourth, to provide a product of this class which eliminates to a maximum deleterious and other matter and provides a maximum vegetable product; fifth, to provide a process for preparing agar in which the material throughout the process is handled without handling by hands, thus providing a very sanitary method of producing agar; sixth, to provide a method of producing agar which reduces to a minimum the time required for producing agar from the seaweed; and seventh, to provide a product and process of this class which is very simple and economical of production and operation.

With these and other objects in view, as will appear hereinafter, my invention consists of the certain novel product and the certain novel process of producing the same, as will be hereinafter described in detail and particularly set forth in the appended claims.

In carrying out my process and producing my product, I use equipment, some of which is conventional and some of which is special equipment prepared for the purpose of producing my product and to be used in connection with my process, which special equipment is covered by applications for Letters Patent which are filed as companion applications at the same time with this application, namely, a patent application for means and method of cooking agar-producing weed or the like, another for means and method of dehydrating flaked agar or the like, another for dewaterers for flaked agar or the like, and another for combined congealer and sizer.

The drawing is a diagrammatic view of the equipment positioned and numbered in consecutive order in connection with the steps of the process.

In preparing my compound I utilize species of the appropriate seaweed family known as "gelidium," which is freshly gathered from the bed of the ocean or sea. After gathering, the weed is dried in the sun by exposing it to the direct rays of the sun, after which it is baled or tied in bundles and stored until ready for use. The weed is then soaked and washed as follows:

The weed is spread out in wooden vats, indicated by the numeral 1 in the drawings, and covered with water. After soaking for several hours, the water is drained off and fresh water added, which is repeated at six-hour intervals for twenty-four hours, after which the weed, thoroughly soaked and washed free of sand, salt and other foreign matter, is picked up with forks and thrown into a large wire basket, which fits inside the cooker. It is then ready for cooking as follows:

The basket holds approximately 800 to 1000 pounds, to which is added 800 to 1000 gallons of water. The basket is then lowered into a pressure cooker arranged with steam coils with a constant temperature control and cooked at various degrees of temperature over various periods of time, the age of the gelidium weed being the controlling feature as to the temperature and time. After a portion of the gelidium has been taken up by the water, the liquid is drawn off and placed in a tank where a filter mass and charcoal are added; then the mass is agitated and at the same time pumped through a filter press. The filter mass and charcoal, with the aid of the filter press, decolorizes, deodorizes and clarifies the liquor, which is then passed to a storage tank from where it is taken into an evaporator where, with the assistance of a vacuum pump, the excess moisture is evaporated from the liquor, producing a constant agar content. After the liquor passes from the vacuum evaporator it is passed into a congealer and sizer, the size of the sized particles predetermining the size of the finished flakes. This sized jell is then permitted to flow into ice cans, which are placed in a brine tank and frozen; then the ice is ground and a thaw produced by adding increased amounts of fresh water at atmospheric temperature, the excess water being drawn off by vacuum, which collects the flaked particles of agar and deposits them in an automatic dehydrater into which the moist agar is admitted. The moist agar at the bottom, coming in contact with the flow of warm air from a blower over steam pipes, causes the flakes of agar to be carried upwardly as the moisture content is decreased, and when they are fairly dry, they flow over the top of the dehydrater into a shipping container and are ready for use.

Though I have described a certain product and process of producing the same, I do not wish to be limited to this particular product nor to the process of producing the same, but desire to include in the scope of my invention, the product and process substantially as set forth in the appended claims.

Having thus described my invention, what I claim as new and desire to secure by Letters Patent is:

1. The herein described method of producing agar, consisting in first soaking and washing the appropriate seaweed, then adding to each pound of seaweed one gallon of water, then cooking the mass under constant temperature and pressure, then drawing the liquor off, then filtering the liquor through a tank with filter mass and charcoal, then agitating the mass, then conducting it to a storage tank, then evaporating the excess moisture from the mass, then congealing the mass to a temperature of about 60 degrees Fahrenheit, then sizing the mass, then freezing the sized mass, then melting the ice and drawing off the excess water by vacuum, and then dehydrating the mass.

2. The herein described process of producing agar, consisting in cooking the appropriate seaweed, then drawing the liquor off, then agitating the mass, then evaporating the excess water from the mass, then cooling the mass to a temperature of about 60 degrees Fahrenheit, then sizing the mass, then freezing the sized mass, then melting the ice and drawing off the excess water, and then dehydrating the mass.

3. The herein described method of producing agar, consisting in first gathering gelidium weed, then washing the sand, salt and other matter therefrom, then adding for each pound of seaweed, one gallon of water, then placing the mass in a pressure cooker and keeping it at a constant temperature and pressure for a certain length of time depending upon the age of the weed, then drawing the liquor off from the weed and placing it in a tank with a filter mass and charcoal, then agitating the mass and pumping it through a filtered preparation, then conducting it to a storage tank, then evaporating the excess water from the mass, then congealing the mass to a temperature of about 60 degrees Fahrenheit, then sizing the mass, then freezing the sized mass, then melting the ice and drawing off the excess water by vacuum, and then dehydrating the mass.

4. The herein described process of producing agar, comprising cooking the appropriate seaweed, then freezing the mass, then melting the frozen mass and then dehydrating the mass.

5. The herein described process of producing agar, comprising cooking the appropriate sea weed, then evaporating the excess water from the mass, then freezing the mass, then melting the frozen mass and then dehydrating the mass.

6. The herein described process of producing agar, comprising cooking the appropriate sea weed, then evaporating the excess water from the mass, then freezing the mass, then melting the frozen mass and then drawing off the excess water from the mass.

7. The herein described process of producing agar, comprising cooking the appropriate sea weed, then evaporating the excess water from the mass, then freezing the mass, then melting the frozen mass and then drawing off the excess water from the mass, and then dehydrating the mass.

8. The herein described process of producing agar, comprising cooking the appropriate sea weed, then evaporating the excess water from the mass, then cooling the mass then freezing the mass, then melting the frozen mass, then drawing off the excess water and then dehydrating the mass.

In testimony whereof, I have hereunto set my hand at San Diego, California, this 27th day of Novemeber, 1926.

JOHN BECKER.